United States Patent [19]

Mallett

[11] Patent Number: 5,189,350
[45] Date of Patent: Feb. 23, 1993

[54] MONITORING SYSTEM

[75] Inventor: Dudley C. Mallett, Blackheath, England

[73] Assignee: J. H. Fenner & Co., Ltd., North Humberside, England

[21] Appl. No.: 555,466

[22] PCT Filed: Feb. 17, 1989

[86] PCT No.: PCT/GB89/00177

§ 371 Date: Oct. 18, 1990

§ 102(e) Date: Oct. 18, 1990

[87] PCT Pub. No.: WO89/07852

PCT Pub. Date: Aug. 24, 1989

[30] Foreign Application Priority Data

Feb. 18, 1988 [GB] United Kingdom ............... 8803827

[51] Int. Cl.$^5$ .............. H02H 7/085; H02H 1/00; G01D 9/00

[52] U.S. Cl. ................... 318/434; 318/471; 318/473; 361/30; 361/31

[58] Field of Search ............ 318/430–434, 318/490, 471–473, 809; 388/800–912; 361/20–34

[56] References Cited

U.S. PATENT DOCUMENTS

| | | | |
|---|---|---|---|
| 3,949,782 | 4/1976 | Athey et al. | 318/434 |
| 4,194,129 | 3/1980 | Dumbeck | 318/490 X |
| 4,264,854 | 4/1981 | Hawtree | 318/809 |
| 4,291,355 | 9/1981 | Dinger | 361/31 |
| 4,410,846 | 10/1983 | Gerber et al. | 318/490 |
| 4,413,325 | 11/1983 | Elfner et al. | 361/30 |
| 4,434,390 | 2/1984 | Elms | 318/473 |
| 4,467,260 | 8/1984 | Mallick, Jr. et al. | 318/434 X |
| 4,544,982 | 10/1985 | Boothman et al. | 361/31 |
| 4,547,826 | 10/1985 | Premerlani | 361/25 |
| 4,550,277 | 10/1985 | Carney | 318/434 X |
| 4,626,753 | 12/1986 | Letterman | 318/471 |
| 4,659,976 | 4/1987 | Johanson | 318/434 |
| 4,743,818 | 5/1988 | Quayle et al. | 318/473 |
| 5,019,760 | 5/1991 | Chu et al. | 318/490 |
| 5,025,198 | 6/1991 | Mordue et al. | 318/434 |

Primary Examiner—Paul Ip
Attorney, Agent, or Firm—Burns, Doane, Swecker & Mathis

[57] ABSTRACT

A monitoring system for an electric motor including a temperature sensor (5) for monitoring the operating temperature of a motor, a memory (4) in which is stored the absolute maximum operating temperature and a predetermined maximum permitted operating temperature of the motor, and an indicator (6) for indicating the sensed temperature as lying: a) within a safe operating range, below the predetermined maximum permitted operating temperature; b) within a hazardous operating range, between the predetermined maximum permitted operating temperature and the absolute maximum operating temperature; and c) at or above a dangerous operating range, lying at or above the absolute maximum operating temperature. The monitoring system further includes a recorder (93) for recording the number of times the motor is operating beyond the predetermined maximum permitted operating temperature and the number of times the motor is operated beyond the absolute maximum operating temperature.

14 Claims, 1 Drawing Sheet

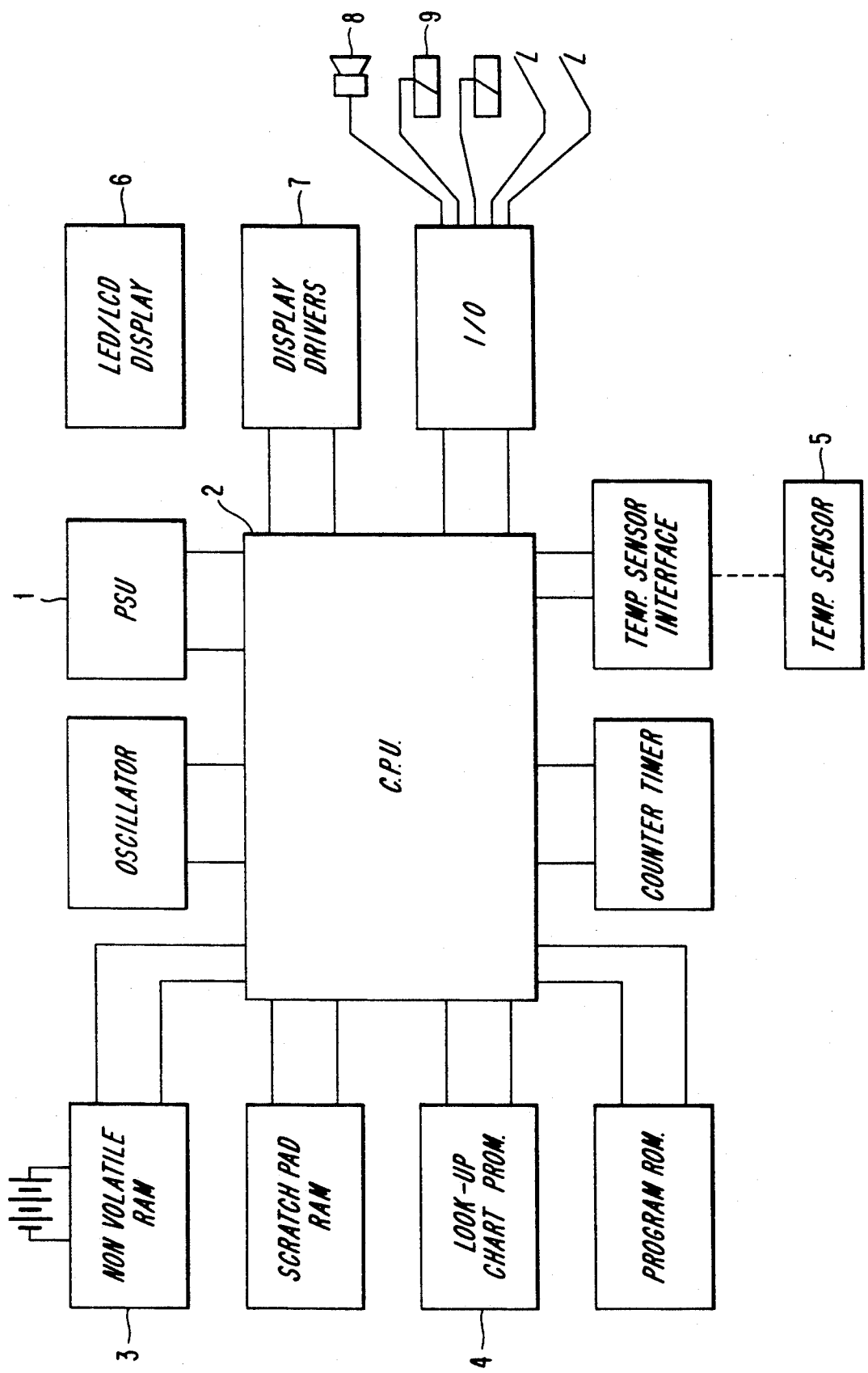

MONITORING SYSTEM

BACKGROUND OF THE INVENTION

The present invention relates to a monitoring system for electric motors and more particularly to a monitoring system which provides an indication of a motor's useful operating capacity. The monitoring system also allows an historical record to be made of the motor's operating conditions during its working life. The monitoring system can be used with all electric motors, but is particularly intended for use with low cost DC motors of the type commonly found in tail gate lifts, fork lift trucks and the like.

It is known to protect electric motors against overheating by providing simple thermal trips to interrupt the supply of power to the motor whenever the motor temperature exceeds a maximum predetermined level. Typically, the thermal trip takes the form of either a bi-metallic switch which interrupts the supply of power to the motor on thermal overload or a resistive temperature sensor which supplies a current proportional to temperature to a motor cut-out circuit. Both types of thermal trip have short duration memories and operate on fixed temperature levels so that immediately the motor temperature drops back below the maximum predetermined level the thermal overload condition ceases to effect the thermal trip. Moreover, immediately prior to a thermal overload condition arising no warning is given to the operative that the motor is overheating.

Overheating will always have a detrimental effect on the life expectancy of an electric motor and is therefore to be avoided if at all possible. However, the effect of overheating on low cost DC motors (which are typically intended for short duration operations and not continuous use) can be particularly severe; these low cost DC motors are easily damaged if overheated for even a relatively short period of time. Notwithstanding this though it is often the case that low cost DC motors find use in applications where they are sometimes operated close to the maximum "safe" operating capacity. In these circumstances potentially damaging overheating of the motor can occur even though the thermal trip is not actually operated and the operative may not be aware of the abuse to which the motor is being subjected. If the abuse continues to a point where the thermal trip actually cuts out the motor is, of course, disabled, until its temperature has dropped and this can be both inconvenient and dangerous. Consider the case of a fork lift truck which has been operating close to its maximum safe operating capacity for a prolonged period of time. Its motor will have been getting hotter and hotter without the operative necessarily being aware and if the motor cuts out in the middle of a lifting operation this is both inconvenient and potentially hazardous.

Whilst thermal trips can protect a motor against being operated at unacceptably high temperature levels, they do not provide any indication of the motor's useful operating capacity under specific operating conditions. As such no indication is given that the motor is being operated at the extreme of its working capacity or when it is likely to cut-out. Moreover, since different thermal capacity motors must be used to suit different operating conditions, this means that a motor may end up being used in a totally unsuitable application and no indication of this will be provided until the motor actually fails. Finally, with known thermal trips there is no record of any abuse to which a motor has been subjected and because of this the manufacturer may be required to replace a motor (within the terms of warranties and guarantees provided with) it even though it has not been used correctly.

SUMMARY OF THE INVENTION

It is an object of the present invention to provide a monitoring system for an electric motor which provides an indication of the motor's useful operating capacity under any particular operating conditions.

It is yet another object of the present invention to provide a monitoring system for an electric motor which enables an historical record to be made of the motor's operating conditions during its working life.

According to a first aspect of the present invention there is provided a method of monitoring the instantaneous operating capacity of "a non-continuously rated" electric motor, wherein the absolute maximum operating temperature and a predetermined maximum permitted operating temperature of a motor are stored, and the operating temperature of the motor is sensed and indicated as lying:

a) within a safe operating range, below the predetermined maximum permitted operating temperature;

b) within a hazardous operating range, lying between the predetermined maximum permitted operating temperature and the absolute maximum operating temperature; and c) at or above a dangerous operating point lying at or above the absolute maximum operating temperature.

By way of explanation the absolute maximum operating temperature of the motor is the maximum temperature at which the motor can operate, i.e. it is 100% of its operating temperature range, and at this temperature destruction of the motor can occur. The predetermined maximum permitted operating temperature is the maximum temperature at which the motor can operate with no risk of damage to the motor at all. Between these two temperatures is a hazardous zone in which the motor can be operated if necessary, though not without some over-heating of the motor.

The absolute maximum operating temperature and the predetermined maximum permitted operating temperature can be determined for each type of motor by experimental measurements or they can be predicted from operational data. In either case a safety margin may be added to the actual temperature arrived at to provide additional protection against abuse of the motor.

In use the operating capacity of a motor is indicated to an operative in simple and easily understood terms, that is to say safe, hazardous or dangerous, and it becomes impossible to operate the motor without being aware of the effect of a load on it.

Preferably, the motor cuts out if its operating temperature exceeds the predetermined maximum permitted operating temperature and thus ensures that the motor is not unwittingly operated beyond its safe working temperature.

Preferably, the cut-out can be overriden to enable the motor to operate in the hazardous range, thus ensuring that the motor can still be operated in circumstances where, for example, safety considerations override the risk of damage to the motor.

Preferably, the cut-out cannot be overriden when the operating temperature of the motor exceeds the absolute maximum operating temperature, thereby ensuring that the motor cannot be operated under conditions in which destruction is likely to occur.

According to a second aspect of the present invention there is provided a monitoring system for "a non-continuously rated" an electric motor comprising a temperature sensor for monitoring the operating temperature of a motor, memory means in which is stored the absolute maximum operating temperature and a predetermined maximum permitted operating temperature of the motor, and indicator means for indicating the sensed temperature as lying:

a) within a safe operating range, below the predetermined maximum permitted operating temperature;

b) within a hazardous operating range, between the predetermined maximum permitted operating temperature and the absolute maximum operating temperature; and c) at or above a dangerous operating range, lying at and above the absolute maximum operating temperature, thereby indicating the instantaneous operating capacity of the motor.

The indicator means may comprise lights or a meter whose scale is divided up to show the safe range, the hazardous range and the danger point. Where lights are used it may be convenient to provide a plurality of lights for the safe and hazardous ranges each of which indicates a discrete temperature range and is contiguous with the others. Thus, it is possible to discern the effect of a load on the operating capacity of a motor immediately as the lights illuminated change or the meter needle passes over the scale. There can then be no doubt that a motor is being driven towards the extremes of its operating capacity or allowed to operate within its normal operating capacity.

Preferably, the indicator lights comprise LED's which are advantageously of different colours to denote the three operating conditions e.g. green for safe, yellow for hazardous and red for dangerous. Alternatively elecetric lights or a quartz crystal display may be used.

Advantageously, each light is driven by a flasher unit (e.g., included as part of a display driver unit such as display driver unit 7 in the FIGURE) which flashes the light at a rate directly proportional to the sensed temperature of the motor within the temperature range covered by the light. Thus, as the temperature of the motor changes through a particular range of temperatures, the frequency at which the light covering that range flashes increases or decreases accordingly. This further helps the operative to identify the effect of the load place on a motor on its operating capacity.

Preferably, the monitoring system comprises a motor cut-out which interrupts the supply of power to the motor when the operating temperature thereof exceeds the predetermined maximum permitted operating temperature. Preferably, the monitoring system also comprises a cut-out override whereby the supply of power to the motor can be recommenced by an operative.

Preferably, the motor cut-out override is not effective when the operating temperature of the motor exceeds the absolute maximum operating temperature of the motor.

According to a third aspect of the present invention there is provided a monitoring system for an electrical motor comprising a temperature sensor, a memory in which are stored the absolute maximum operating temperature and a predetermined maximum permitted operating temperature of the motor, and recording means for recording the number of times the motor is operated beyond the predetermined maximum permitted operating temperature and the number of times the motor is operated beyond the absolute maximum operating temperature.

Preferably, said recording means also records:

a) the total running time of the motor;

b) the total number of operations performed by the motor; and/or c) the operating conditions of the motor prevailing during the last operation.

The historical information recorded during the working life of the motor shows the amount of abuse, if any, to which the motor has been subjected. This can be especially useful to the manufacturer in determining whether warranties and conditions of use have been fully complied with. It also provides a useful servicing tool, enabling the previous operating conditions of the motor to be considered without requiring the motor to be removed for examination. This information is also useful in determining the appropriateness of the motor to the application for which it is being used, i.e. whether it is being under or overworked.

Preferably, the recording means takes the form of a random access memory. In this respect the monitoring device conveniently comprises a timer device which is turned on each time the motor is operated and switched off when the motor's operation is concluded.

Conveniently, the recorded information can be accessed by means of a data link. This data link may conveniently take the form of an infra red transmitter and an infra red sensor, although other forms of data link are equally applicable.

An embodiment of the present invention will now be described, by way of example, with reference to the accompanying drawing, which shows a block circuit diagram of a monitoring sysem in accordance with the present invention.

Referring to the accompanying drawing there is show a monitoring system in accordance with the present invention which essentially comprises a power supply 1, a central processor unit (CPU) 2, a non-volatile random access memory (RAM) 3, read only memory (ROM) 4, temperature sensor 5 and an indicator display 6. The temperature sensor 5 is intended in use to be mounted inside or outside a motor to be monitored. If its is inside it may be separate from the rest of the monitoring system in which case it can be connected to the rest of the monitoring system by means of a cable and connector arrangement.

BRIEF DESCRIPTION OF THE DRAWINGS

Other objects and advantages of the present invention will become more apparent from the following detailed description of preferred embodiments when read in conjunction with the accompanying drawings, wherein like elements have been designated by like numerals, and wherein:

The sole FIGURE shows a block circuit diagram of a monitoring system in accordance with the present invention.

DETAILED DESCRIPTION OF PREFERRED EMBODIMENTS

The indicator display 6 comprises a plurality of light emitting diodes (not shown separately) each of which is separately driven by display driver unit 7. Each LED within the indicator display 6 covers a discrete range of temperatures within overall working temperature range of a motor to be monitored. The ranges covered by the LED's are contiguous to avoid any gaps in monitoring. Conveniently, different coloured LEDs are used to denote the different temperature states of the motor, e.g. green LEDs denote acceptable or safe temperature levels, yellow a warning or hazardous level and red the critical or dangerous temperature level. Also associated with the indicator display 6 is an audio alarm 8 which sounds each time the temperature of the motor rises enough to illuminate the next LED in the indicator display 6.

Typically, the safe and hazardous temperature ranges each comprise a plurality of LED's and the dangerous temperature level comprises a single LED. In this way an operative can readily see the operating conditions of the motor change through safe to hazardous and, thus, through hazardous to dangerous.

Within the ROM 4 is stored information relating to the motor being monitored, including its absolute maximum operating temperature and predetermined maximum permitted operating temperature.

The random access memory 3 is intended, in use, to hold or record details of the motor's operating conditions during its working life and in this respect it is provided with data from the central processor unit 2. The information stored in RAM 3 may be accessed by an operator provided with an appropriate data link and in the embodiment of the present invention shown in the accompanying drawings this takes the form of an infrared data link 9, although other forms of data link are equally applicable.

The central processor unit 2 constitutes the heart of the monitoring system in as much as it is responsible for controlling each of the various operations which are carried out by the device. In this respect, the CPU controls the supply of data to the random access memory 3, the operation of a motor control (not shown) and it also makes the necessary calculations from which control signals to the display driver unit 7 are provided.

Operation of the monitoring device will now be described:

Prior to use the monitoring system is provided with details of the operating characteristics of the or each motor with which it is intended to be used. These details include the predetermined maximum permitted operating temperature and the absolute maximum operating temperature of the motor and optionally, amongst other things, the ideal position of the temperature sensor 5 within the motor. These details are input to the read only memory 4. Using the information stored in ROM 4 the CPU 2 determines which of the LED's need be illuminated to indicate a particular operating state of the motor and divides the temperature ranges below the predetermined maximum permitted operating temperature and between the predetermined maximum permitted operating temperature and the absolute maximum permitted operating temperature amongst the LED's covering each operating state. In this respect, it will be understood that the absolute maximum operating temperature and the predetermined maximum permitted operating temperature will vary from motor to motor and hence it is necessary to adjust the output of the CPU 2 to the LED drivers 7 to ensure that the appropriate LED's are illuminated to reflect motor status, rather than actual sensed temperature.

Consider, for example, that there are five LED's in the display 6, three green, one yellow and one red. The three green LED's will each cover a respective range of temperatures below the predetermined maximum, the one yellow LED will cover the whole range between the predetermined maximum and the absolute maximum and the one red LED will cover all temperatures at or above the absolute maximum. More green or yellow LED's simply mean that the range of temperatures covered thereby are further divided up to give a more precise indication to the operative of the operating capacity of the motor within the safe or hazardous operating state.

The temperature sensor 5 is mounted inside or outside the motor and an analogue signal corresponding to the sensed temperature is output therefrom to an analogue to digital convertor (not show). The convertor converts the output signal of the sensor 5 into digital signal capable of interpretation by the CPU 2. Making use of the information stored in ROM 4 the CPU 2 causes the LED covering the range of temperatures in which the sensed temperature falls to be switched on, thus providing a clear and unambiguous indication to the operative of the operating status of the motor.

Associated with the monitoring system is a motor control (not shown) which, through a series of switches (not shown), enables the operator to energise the motor. Under normal operating conditions, that is to say, when the temperature of the motor lies well below the prdetermined maximum permitted operating temperature and in the safe (green) range as indicated by the indicator display 6, the motor control will energise the motor. However, as the motor is operated over a period of time its temperature may rise and the signal output from the sensor 5 will change. This is indicated to the operative as successive LED's in the display 6 are lit and the audio alarm 7 sounds.

Should the operative operate the motor repeatedly over a short space of time or allow it to operate under an abnormally high load the temperature of the motor will rise rapidly to the point where the hazardous (yellow) LED s are illuminated. This is to prevent the motor from being operated beyond its predetermined permitted maximum temperature range, which will, of course, substantially reduce its useful working life. However, the cut-out can be overriden if required as, for example, may be required where safety considerations outweigh the disadvantages of causing permanent harm to the motor.

Should the temperature of the motor be allowed to rise still further to the absolute maximum operating temperature, i.e. the point where it reaches 100% of the motor's operating temperature range, the central processor unit will cause the motor control to switch off the motor, regardless of any attempt which might be made by the operative to override this instruction. As will be readily appreciated, at the absolute maximum operating temperature failure of the motor is likely to occur almost immediately.

It is worth repeating here that a distinction is drawn between the predetermined maximum permitted operating temperature and the absolute maximum operating temperature of the motor. At or above the former the motor can be operated, even though its life expectancy may be reduced. At the latter failure of the motor will be imminent. Hence the reason why the predetermined maximum can be overriden, whilst the absolute maximum cannot.

The permitted maximum and the absolute maximum may be determined in a number of ways. A first possibility is by experimenting or testing which can be carried out by either the manufacturer or the user. Alternatively, these values can be freshly determined each time the motor is used. Both values are stored in memory.

In addition to controlling the operation of the motor and interpretting the temperature sensed by the sensor 5 into an output shown on the indicator display 6, the CPU 2 also ensures that data relating to the operating conditions of the motor are passed to the non-volatile RAM 3 for storage. The actual data stored may vary from circumstance to circumstance, but as a general rule the following information is likely to prove most useful:

a) the number of times the motor is operated;
b) the total length of time for which it is operated;
c) the number of times the motor is operated beyond its predetermined maximum permitted operating temperature;
d) the number of shut downs (operations at absolute maximum operating temperature); and
e) the operating conditions during the last operation or cycle.

The total length of time for which a motor is operated is determined by a counter device which is switched on each time the motor is energised for the a) the number of times the motor is operated;
b) the total length of time for which it is operated;
c) the number of times the motor is operated beyond its predetermined maximum permitted operating temperature;
d) the number of shut downs (operations at absolute maximum operating temperature); and
e) the operating conditions during the last operation or cycle.

The total length of time for which a motor is operated is determined by a counter device which is switched on each time the motor is energised for the duration of the operation.

The information listed above can be accessed from the non-volatile RAM 3 using the data link 9 and read out onto a readable display.

The CPU 2 may also output information from the ROM 4 relating to the type of motor which should be used in the particular application in hand, where the temperature sensor should be fitted in the motor and the like for display to the operator. This additional information, being preprogrammed into the ROM 4, would be based upon the operating characteristics of a range of motors.

The monitoring system of the present invention may be permanently mounted in-situ within a motor. Alternatively, it may take the form of hand held device which can be fitted to a particular motor to allow it to be monitored over a period of time and an assessment of its suitability for the particular application at hand determined.

The monitoring system of the present invention may find a wide range of specific applications. For example, in fork lift trucks, vehicles having electric starter motors, precinct cleanser, indeed in almost any machine which makes use of an electric motor.

Finally, the monitoring system in accordance with the present invention has particular application with motors which make use of pulse width modulation (PMW) to control the ouptut. The monitoring device may be used to provide a control signal to the PMW generator proportional to the temperature of the motor. Thus, as the temperature of the motor rises above a safe level the monitoring device may vary the output of the PWM generator to regulate the output of the motor and bring it back within safe operating limits.

I claim:

1. A method of monitoring the instantaneous operating capacity of a non-continuously rated electric motor, comprising the steps of:

storing an absolute maximum operating temperature and a predetermined maximum permitted operating temperature of a motor;

sensing an operating temperature of the motor;

indicating, in response to said steps of storing and sensing, the sensed operating temperature as lying:

a) within a safe operating range, below the predetermined maximum permitted operating temperature;
b) within a hazardous operating range, lying between the predetermined maximum permitted operating temperature and the absolute maximum operating temperature; and
c) at or above a dangerous operating point lying at or above the absolute maximum operating temperature; and operating a motor cut-out if the operating temperature of the motor exceeds the predetermined maximum permitted operating temperature, which cut-out can be manually overridden to enable continued operation of the motor in the hazardous operating range, but which cannot be manually overridden which the operating temperature of the motor reaches the absolute maximum operating temperature.

2. A monitoring system for an electric motor comprising:

a temperature sensor for sensing the operating temperature of a motor over an operating range of the motor;

memory means for storing an absolute maximum operating temperature and a predetermined maximum permitted operating temperature of the motor;

indicator means, responsive to the temperature sensor and the memory means, for indicating the sensed temperature as lying:

a) within a safe operating range, below the predetermined maximum permitted operating temperature;
b) within a hazardous operating range, between the predetermined maximum permitted operating temperature and the absolute maximum operating temperature; and
c) at or above a dangerous operating range, lying at or above the absolute maximum operating temperature; and a cut-out which operates to interrupt a supply of power to the motor when the operating temperature of the motor exceeds the predetermined maximum permitted operating temperature, said cut-out further including a cut-out override which is effective between the predetermined maximum permitted operating temperature and the absolute maximum operating temperature.

3. A monitoring system according to claim 2, wherein said motor is a non-continuously rated electric motor and wherein the indicator means further includes:

a plurality of lights.

4. A monitoring system according to claim 3, wherein the plurality of lights includes lights for indicating both the safe and the hazardous operating ranges, each of which lights indicates a discrete temperature range within the motor operating range.

5. A monitoring system according to claim 4, wherein the plurality of lights comprise LED's of different colors to denote the safe operating range, the hazardous operating range and the dangerous operating range.

6. A monitoring system according to claim 5 wherein each of said plurality of lights is driven by a flasher unit which flashes each light at a rate directly proportional to the sensed temperature of the motor within the temperature range covered by each light.

7. A monitoring system according to claim 2, wherein the indicator means further comprises:
a meter.

8. A monitoring system according to claim 7, comprising a cut-out which interrupts the supply of power to the motor when the operating temperature thereof exceeds the predetermined maximum permitted operating temperature.

9. A monitoring system according to claim 8, comprising a cut-out override which is effective between the predetermined maximum permitted operating temperature and the absolute maximum operating temperature of the motor.

10. A monitoring system according to claim 2 further comprising:
recording means for recording a number of times the motor is operated at an operating temperature beyond the predetermined maximum permitted operating temperature and a number of times the motor is operated at an operating temperature beyond the absolute maximum operating temperature.

11. A monitoring system according to claim 10, wherein said recording means also records:
a) a total running time of the motor;
b) a total number of operations performed by the motor; and/or
c) operating conditions of the motor prevailing during a preceding operation.

12. A monitoring system according to claim 11, wherein the recording means further comprises:
a random access memory.

13. A monitoring system according to claim 12 further comprising:
a timer device which is turned on each time the motor is operated and switched off when the motor's operation is concluded.

14. A monitoring system according to claim 13 further comprising:
a data link for accessing recorded information.

* * * * *